(12) United States Patent
Harada et al.

(10) Patent No.: US 10,577,513 B2
(45) Date of Patent: Mar. 3, 2020

(54) PRINTING INK COMPOSITION FOR LAMINATES AND EASILY TEARABLE LAMINATE

(71) Applicant: SAKATA INX CORPORATION, Osaka-shi, Osaka (JP)

(72) Inventors: Junichi Harada, Osaka (JP); Yoshiaki Maeoka, Osaka (JP); Ken Natsuki, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 117 days.

(21) Appl. No.: 15/744,730

(22) PCT Filed: Jul. 28, 2016

(86) PCT No.: PCT/JP2016/072222
§ 371 (c)(1),
(2) Date: Jan. 12, 2018

(87) PCT Pub. No.: WO2017/022640
PCT Pub. Date: Feb. 9, 2017

(65) Prior Publication Data
US 2018/0208786 A1 Jul. 26, 2018

(30) Foreign Application Priority Data
Jul. 31, 2015 (JP) .................. 2015-151410

(51) Int. Cl.
| | | |
|---|---|---|
| C09D 11/00 | (2014.01) | |
| C09D 11/102 | (2014.01) | |
| C09J 201/06 | (2006.01) | |
| B32B 27/08 | (2006.01) | |
| C09D 11/106 | (2014.01) | |
| B32B 27/36 | (2006.01) | |
| C09D 11/037 | (2014.01) | |
| B32B 27/40 | (2006.01) | |
| B32B 7/06 | (2019.01) | |
| B32B 7/12 | (2006.01) | |
| C09D 11/03 | (2014.01) | |

(52) U.S. Cl.
CPC .............. *C09D 11/102* (2013.01); *B32B 7/06* (2013.01); *B32B 7/12* (2013.01); *B32B 27/08* (2013.01); *B32B 27/36* (2013.01); *B32B 27/40* (2013.01); *C09D 11/03* (2013.01); *C09D 11/037* (2013.01); *C09D 11/106* (2013.01); *C09J 201/06* (2013.01); *B32B 2250/02* (2013.01); *B32B 2250/24* (2013.01); *B32B 2255/10* (2013.01); *B32B 2255/26* (2013.01); *B32B 2307/31* (2013.01); *B32B 2307/4023* (2013.01); *B32B 2307/582* (2013.01); *B32B 2307/5825* (2013.01); *B32B 2439/46* (2013.01)

(58) Field of Classification Search
CPC ..... C09D 11/102; C09D 11/03; C09D 11/037; C09D 11/106; B32B 7/06; B32B 7/12; C09J 201/06
USPC ....................................... 523/200
See application file for complete search history.

(56) References Cited

U.S. PATENT DOCUMENTS 5,556,925 A * 9/1996 Kousaka ................ C08G 18/12
523/161

FOREIGN PATENT DOCUMENTS

| JP | H0597959 A | 4/1993 |
|---|---|---|
| JP | 2008274061 A | 11/2008 |
| JP | 2009137261 A | 6/2009 |
| JP | 2012125978 A | 7/2012 |
| JP | 2013194121 A | 9/2013 |
| JP | 2014005318 A | 1/2014 |
| JP | 2014019846 A | 2/2014 |

OTHER PUBLICATIONS

Notification Concerning Transmittal of International Preliminary Report on Patentability (PCT/IB326) and Notification of Transmittal of Translation of the International Preliminary Report on Patentability (PCT/IB/338) dated Feb. 15, 2018, with International Preliminary Report on Patentability (PCT/IB/373) and Written Opinion of the International Searching Authority (PCT/ISA/237), for corresponding international application PCT/JP2016/072222.
International Search Report (ISR) dated Sep. 6, 2016, issued for International application No. PCT/JP2016/072222.

\* cited by examiner

*Primary Examiner* — Hannah J Pak
(74) *Attorney, Agent, or Firm* — Law Office of Katsuhiro Arai

(57) ABSTRACT

A printing ink composition for laminate contains a pigment, a binder resin, a polyfunctional isocyanate compound as curing agent, and an organic solvent, wherein the binder resin is a polyurethane resin and a vinyl chloride-vinyl acetate copolymer; at least one of the polyurethane resin and vinyl chloride-vinyl acetate copolymer has a reactive group that can react with the isocyanate group in the polyfunctional isocyanate compound; the ratio of the solid content of the polyurethane resin and that of the vinyl chloride-vinyl acetate copolymer is in a range of 9/1 to 1/9 (polyurethane resin/vinyl chloride-vinyl acetate copolymer); and the ratio of the sum of the solid contents of the polyurethane resin and vinyl chloride-vinyl acetate copolymer and the solid content of the curing agent is in a range of 1:0.2 to 0.9 ((polyurethane resin+copolymer):curing agent).

16 Claims, No Drawings

PRINTING INK COMPOSITION FOR LAMINATES AND EASILY TEARABLE LAMINATE

This application is the U.S. National Phase under 35 U.S.C. § 371 of International Application PCT/JP2016/072222, filed Jul. 28, 2016, which claims priority to Japanese Patent Application No. 2015-151410, filed Jul. 31, 2015. The International Application was published under PCT Article 21(2) in a language other than English.

TECHNICAL FIELD

The present invention relates to a printing ink composition for laminate, as well as an easily tearable laminate obtained by printing such printing ink for laminate on a base film and then applying an adhesive and layering a sealant film thereon.

BACKGROUND ART

Food, confectionery, general merchandise for everyday use, pet food, etc., adopt packaging materials that use various types of plastic films, to take advantage of their design property, economy, content protection property, ease of transportation, and other functions. Also, many packaging materials are printed on by means of gravure printing or flexographic printing, with the intent of adding design or message features that would appeal to consumers.

And, to obtain the intended packaging material, front printing is performed which involves printing on the front side of the base film of the packaging material, or an adhesive or anchor agent is applied on the printing side of the base film of the packaging material, as necessary, after which reverse printing is preformed to laminate the film.

In reverse printing, colored inks and white ink are printed one by one on a polyester or nylon film, aluminum foil, or any other type of film, and then a polyethylene film, polypropylene film, or the like, is layered on the white-ink printed layer, for the purpose of heat sealing, by means of dry lamination using adhesive, extrusion lamination using anchor coating agent, etc. (refer to Patent Literature 1, for example).

Thereafter, the laminate is used as a laminate bag for storing food, such as confectionery, soup, miso soup, or the like. Laminate bags like these are opened by human hands in order to take out the contents. Here, the bags must be easy to tear because, if they are difficult to tear, excessive force must be applied to open the bag, or the bag may tear in an unintended direction, thereby causing the contents to spill.

In particular, areas that are printed with ink tend to have poor tearing property because the binding force between the ink layer and adhesive layer is lower compared to non-printed areas.

A known means for improving the tearing property is to make the laminate adhesive layer harder (refer to Patent Literature 2, for example); if ink areas are interspersed with non-printed areas without ink, however, a problem occurs that adjusting the hardness of the adhesive layer to a level that permits tearing of the ink areas would make the non-printed areas too hard, while using the hardness of the non-printed areas as a reference would result in poor tearing property of the ink areas.

To solve this problem, an art of blending into an ink layer a curing agent that contains two or more functional groups that can react with the same functional groups in the ink layer and adhesive layer, is proposed, wherein the ink layer is formed according to a composition constituted by a compound (a1) that contains two or more hydroxyl groups, as functional groups, in its molecule, and also by a curing agent that reacts with these hydroxyl groups (refer to Patent Literature 3, for example). In the examples cited, however, the ratio of the solid content of the polyfunctional isocyanate curing agent, relative to that of the polyurethane resin, in the ink layer, is very low at 1:0.25 (polyurethane resin:polyfunctional isocyanate curing agent), which presents a problem that, although the tearing property improves slightly, it is still not sufficient and resistance is felt while tearing.

Also, ink layers using such compound do not develop color fully.

BACKGROUND ART LITERATURE

Patent Literature

Patent Literature 1: Japanese Patent Laid-open No. Hei 5-97959

Patent Literature 2: Japanese Patent Laid-open No. 2008-274061

Patent Literature 3: Japanese Patent Laid-open No. 2012-125978

SUMMARY OF THE INVENTION

Problems to Be Solved by the Invention

An object of the present invention is to provide a printing ink composition for laminate that can demonstrate good color development property and tearing property, as well as an easily tearable laminate obtained by printing such printing ink composition for laminate on a base film and then applying an adhesive and layering a sealant film thereon.

Means for Solving the Problems

After studying in earnest to achieve the aforementioned object, the inventors of the present invention invented the printing ink composition for laminate and laminate as described below.

The present invention includes the following: (1) A printing ink composition for laminate containing a pigment, a binder resin, a polyfunctional isocyanate compound as curing agent, and an organic solvent, wherein such printing ink composition for laminate is characterized in that: the binder resin is a polyurethane resin and a vinyl chloride-vinyl acetate copolymer; at least one of the polyurethane resin and vinyl chloride-vinyl acetate copolymer has a reactive group that can react with the isocyanate group in the polyfunctional isocyanate compound; the ratio of the solid content of the polyurethane resin and that of the vinyl chloride-vinyl acetate copolymer is in a range of 9/1 to 1/9 (polyurethane resin/vinyl chloride-vinyl acetate copolymer); and the ratio of the sum of the solid contents of the polyurethane resin and vinyl chloride-vinyl acetate copolymer and the solid content of the curing agent is in a range of 1:0.2 to 0.9 ((polyurethane resin+vinyl chloride-vinyl acetate copolymer):curing agent).

(2) A printing ink composition for laminate according to (1) above, characterized in that the reactive group in the polyurethane resin, which can react with the isocyanate group in the polyfunctional isocyanate compound, is an amino group and/or hydroxyl group, while the reactive group in the vinyl chloride-vinyl acetate copolymer, which can react with the isocyanate group, is a hydroxyl group.

(3) A printing ink composition for laminate according to (1) or (2) above, characterized in that the binder resin is (1) a polyurethane resin having, at its end, at least one type of primary or secondary amino group as well as hydroxyl group, and/or (2) a polyurethane resin having, at its end, at least one type of primary or secondary amino group, and a vinyl chloride-vinyl acetate copolymer having hydroxyl group.
(4) A printing ink composition for laminate according to any one of (1) to (3) above, characterized in that the ratio of the sum of the solid contents of the polyurethane resin and vinyl chloride-vinyl acetate copolymer and the solid content of the curing agent is in a range of 1:0.4 to 0.9 ((polyurethane resin+vinyl chloride-vinyl acetate copolymer):curing agent).
(5) A printing ink composition for laminate according to any one of (1) to (4) above, characterized in that the ratio of the solid content of the polyurethane resin and that of the vinyl chloride-vinyl acetate copolymer is in a range of 9/1 to 4/6 (polyurethane resin/vinyl chloride-vinyl acetate copolymer).
(6) A printing ink composition for laminate according to any one of (1) to (5) above, characterized in that the polyfunctional isocyanate compound is an at least trifunctional isocyanate compound.
(7) A printing ink composition for laminate according to any one of (1) to (6) above, characterized in that the organic solvent is a mixture of ester-based solvent and alcohol-based solvent.
(8) An easily tearable laminate obtained by layering, on a base film, a layer constituted by a printing ink for laminate according to any one of (1) to (7) above, an adhesive layer having hydroxyl group, and a sealant film, in this order.
(9) An easily tearable laminate according to (8) above, characterized in that it is obtained by printing, on the base film, a printing ink for laminate according to any one of (1) to (7) above, and then applying an adhesive having hydroxyl group and layering a sealant film thereon.

Effects of the Invention

For the binder resin used in the printing ink composition for laminate proposed by the present invention, a polyurethane resin and a vinyl chloride-vinyl acetate copolymer, where at least one of the polyurethane resin and vinyl chloride-vinyl acetate copolymer contains a reactive group that can react with the isocyanate group in the polyfunctional isocyanate compound serving as the curing agent, are used in such a way that the ratio of the solid content of the polyurethane resin and that of the vinyl chloride-vinyl acetate copolymer falls in a range of 9/1 to 1/9 (polyurethane resin/vinyl chloride-vinyl acetate copolymer).

And, because the polyurethane resin and/or vinyl chloride-vinyl acetate copolymer constituting the binder resin has a reactive group that can react with the isocyanate group in the polyfunctional isocyanate compound serving as the curing agent, the binding force between the printing layer and the adhesive layer can be increased by this reactive group reacting with the isocyanate group in the curing agent in the printing ink composition for laminate and also with the isocyanate group in the adhesive layer. In addition, it is considered that, because a polyurethane resin is combined with a vinyl chloride-vinyl acetate copolymer and a curing agent is used by a large quantity so as to achieve a ratio of 1:0.2 to 0.9, or more preferably 1:0.4 to 0.9 ((polyurethane resin+vinyl chloride-vinyl acetate copolymer):curing agent), the ink layer becomes harder and good tearing property is achieved.

In particular, even better tearing property is achieved by using in combination, as the binder resin, (1) a polyurethane resin having, at its end, at least one type of primary or secondary amino group as well as hydroxyl group, and/or (2) a polyurethane resin having, at its end, at least one type of primary or secondary amino group, and a vinyl chloride-vinyl acetate copolymer having hydroxyl group. Also, because the polyurethane resin has, at its end, at least one type of primary or secondary amino group, the viscosity of the polyurethane resin can be adjusted to a range appropriate for the printing ink, while good pigment dispersibility is achieved, as well, and consequently the resin content in the printing ink composition for laminate can be increased.

In addition, it is considered that the good pigment dispersibility leads to good color development property.

MODE FOR CARRYING OUT THE INVENTION

The printing ink composition for laminate and easily tearable laminate proposed by the present invention are explained below in greater detail.

First, the printing ink composition for laminate proposed by the present invention is explained.

<Pigment>

For the pigment under the present invention, any of the various inorganic pigments and/or organic pigments, etc., generally used in printing inks, may be used.

Examples of inorganic pigments include titanium oxide, colcothar, antimony red, cadmium yellow, cobalt blue, Prussian blue, ultramarine blue, carbon black, graphite, and other colored pigments, as well as silica, calcium carbonate, kaolin, clay, barium sulfate, aluminum hydroxide, talc, and other extender pigments.

Examples of organic pigments include soluble azo pigments, insoluble azo pigments, azo lake pigments, condensed azo pigments, copper phthalocyanine pigments, condensed polycyclic pigments, and the like.

Preferably the content of the pigment in the printing ink composition for laminate proposed by the present invention is in a range of 5 to 60 percent by mass in the ink composition.

If the content of the pigment in the printing ink composition for laminate is lower than the aforementioned range, the coloring strength of the ink composition drops; if the content of the pigment is higher than the aforementioned range, on the other hand, the viscosity of the ink composition increases, and the printed matters tend to become dirty.

<Binder Resin>

For the binder resin, a polyurethane resin and a vinyl chloride-vinyl acetate copolymer may be used, where at least one of the polyurethane resin and vinyl chloride-vinyl acetate copolymer may contain a reactive group that can react with the isocyanate group in the polyfunctional isocyanate compound used as the curing agent explained below.

Preferably the reactive group in the polyurethane resin, which can react with the isocyanate group in the polyfunctional isocyanate compound, is an amino group and/or hydroxyl group, while the reactive group in the vinyl chloride-vinyl acetate copolymer, which can react with the isocyanate group, is a hydroxyl group.

Also, from the viewpoint of tearing property, preferably the binder resin is (1) a polyurethane resin having, at its end, at least one type of primary or secondary amino group as well as hydroxyl group, and/or (2) a polyurethane resin having, at its end, at least one type of primary or secondary amino group, and a vinyl chloride-vinyl acetate copolymer having hydroxyl group.

The ratio of the solid contents of the polyurethane resin and vinyl chloride-vinyl acetate copolymer used, is in a range of 9/1 to 1/9 (polyurethane resin/vinyl chloride-vinyl acetate copolymer). If the usage ratio of the polyurethane resin is greater than 9, the tearing property tends to drop; if the usage ratio is smaller than 1, on the other hand, the retortability (boilability and retortability) tends to drop. Also, from the viewpoints of laminatability, and boilability and retortability, preferably the polyurethane resin and vinyl chloride-vinyl acetate copolymer are used in a range of 9/1 to 4/6.

In addition, preferably the content of the binder resin at the time of printing, as the total solid content of the polyurethane resin and vinyl chloride-vinyl acetate copolymer, is 5 to 15 percent by mass in the printing ink composition for laminate. If the content of the binder resin is outside this range, the tearing property tends to drop.

[Polyurethane Resin]

For the polyurethane resin, any polyurethane resin traditionally used in gravure printing ink compositions for laminate may be used.

In particular, a polyurethane resin having a reactive group that can react with the isocyanate group in a polyfunctional diisocyanate compound is preferably used, as doing so is advantageous in improving the performance pertaining to the object of the present invention. For the polyurethane resin having a reactive group that can react with the isocyanate group in a polyfunctional diisocyanate compound, any polyurethane resin having, at its end, at least one type of primary or secondary amino group and/or a hydroxyl group may be used. In particular, (1) a polyurethane resin having, at its end, at least one type of primary or secondary amino group as well as hydroxyl group, and/or (2) a polyurethane resin having, at its end, at least one type of primary or secondary amino group, is preferred.

Such polyurethane resin is obtained by synthesizing an urethane prepolymer through reaction between an organic diisocyanate compound and a high-molecular diol compound, and then causing the obtained urethane prepolymer to react with (1) an amine compound containing a polyamine compound that has, at both its ends, at least one type of primary or secondary amino group, as well as an amine compound having hydroxyl group, or (2) an amine compound containing a polyamine compound that has, at both its ends, at least one type of primary or secondary amino group.

Here, the methods to cause the urethane prepolymer to react with (1) an amine compound containing a polyamine compound that has, at both its ends, at least one type of primary or secondary amino group, as well as an amine compound having hydroxyl group, or (2) an amine compound containing a polyamine compound that has, at both its ends, at least one type of primary or secondary amino group, include (1) a method whereby the urethane prepolymer is caused to undergo chain extension using a chain-extending agent, and then the reaction is stopped using a reaction-stopping agent, and (2) a method whereby the urethane prepolymer is caused to undergo chain extension using a chain-extending agent, and stopping of the reaction using a reaction-stopping agent, simultaneously.

(Organic Diisocyanate Compound)

For the organic diisocyanate compound used to obtain the binder resin, tolylene diisocyanate or other aromatic diisocyanate compound, 1,4-cyclohexane diisocyanate, isophorone diisocyanate or other alicyclic diisocyanate compound, hexamethylene diisocyanate or other aliphatic diisocyanate compound, $\alpha,\alpha,\alpha',\alpha'$-tetramethyl xylylene diisocyanate or other aromatic-aliphatic diisocyanate compound may be used alone or two or more types selected from the foregoing may be mixed and used. Among these, alicyclic diisocyanate, aliphatic diisocyanate, and aromatic-aliphatic diisocyanate are more preferred.

(High-Molecular Diol Compound)

For the high-molecular diol compound used to obtain the binder resin, polyethylene glycol, polypropylene glycol or other polyalkylene glycol, ethylene oxide or propylene oxide of bisphenol A or other alkylene oxide adduct or other polyether diol compound, polyester diol obtained by causing a condensation reaction between one, two, or more types of dibasic acids such as adipic acid, sebacic acid, and phthalic acid anhydrate on one hand, and one, two, or more types of glycols such as ethylene glycol, propylene glycol, 1,4-butane diol, neopentyl glycol, and 3-methyl-1,5-pentane diol on the other, polycaprolactone diol or other polyester diol compound, or any of various other high-molecular diol compounds, may be used alone or two or more types selected from the foregoing may be mixed and used.

Furthermore, 1,4-pentane diol, 2,5-hexane diol, 3-methyl-1,5-pentane diol or other arcane diol, ethylene glycol, propylene glycol, 1,4-butane diol, 1,3-butane diol or other low-molecular diol compound may be used alone, or two or more types selected from the foregoing may be mixed and used, in addition to the aforementioned high-molecular diol compound.

It should be noted that, when mixing an ester solvent with an alcohol solvent, preferably a polyether diol compound is used as the high-molecular diol compound, because doing so tends to achieve higher solubility of the obtained polyurethane resin and permit flexible ink design according to the required performance.

In addition, the usage ratio of the organic diisocyanate compound and the high-molecular diol compound is normally in a range of 1.2:1 to 3.0:1, or more preferably 1.3:1 to 2.0:1, based on the equivalent ratio of isocyanate groups: hydroxyl groups (isocyanate index). If the isocyanate index is smaller than 1.2, the polyurethane resin tends to become flexible, which means that, in some cases where the result of printing with the ink exhibits low blocking resistance, etc., preferably other hard resin is combined.

(Chain-Extending Agent)

Chain-extending agents that can be used to obtain the binder resin are known chain-extending agents that are used in polyurethane resins for ink binders, where examples include ethylene diamine, propylene diamine, tetramethylene diamine, hexamethylene diamine and other aliphatic diamines, isophorone diamine, 4,4'-dicyclohexyl methane diamine and other alicyclic diamines, diethylene triamine, triethylene tetratriamine and other polyamines, toluylene diamine and other aromatic diamines, xylene diamine and other aromatic-aliphatic diamines, N-(2-hydroxy ethyl) ethylene diamine, N-(2-hydroxy ethyl) propylene diamine, N,N'-di(2-hydroxy ethyl) ethylene diamine and other diamines having hydroxyl group, ethylene glycol, propylene glycol, 1,4-butane diol, neopentyl glycol, diethylene glycol, triethylene glycol and other diol compounds.

(Reaction-Stopping Agent)

Examples of reaction-stopping agents that can be used to obtain the binder resin include tetramethylene diamine, hexamethylene diamine and other aliphatic diamines, isophorone diamine, 4,4'-dicyclo hexyl methane diamine and other alicyclic diamines, diethylene triamine, triethylene tetratriamine and other polyamines, toluylene diamine and other aromatic diamines, xylene diamine and other aromatic-aliphatic diamines, N-(2-hydroxy ethyl) ethylene diamine, N-(2-hydroxy ethyl) propylene diamine, N,N'-di (2-hydroxy ethyl) ethylene diamine and other diamines having hydroxyl group, and other polyamine compounds having primary amino groups at both ends, n-propyl amine, n-butyl amine and other monoalkyl amines, di-n-butyl amine and other dialkyl amines, monoethanol amine, diethanol amine and other alkanol amines, ethanol and other monoalcohols, and the like.

To obtain a polyurethane resin having primary amino group and/or secondary amino group at both ends, a polyamine having primary amino group and/or secondary amino group at both ends is used as the reaction-stopping agent. Such polyamine having primary amino group and/or secondary amino group at both ends is ethylene diamine, propylene diamine, tetramethylene diamine, hexamethylene diamine or other aliphatic diamine, isophorone diamine, 4,4'-dicyclohexyl methane diamine or other alicyclic diamine, diethylene triamine, triethylene tetratriamine or other polyamine, toluylene diamine or other aromatic diamine, xylene diamine or other aromatic-aliphatic diamine, N-(2-hydroxy ethyl) ethylene diamine, N-(2-hydroxy ethyl) propylene diamine or other diamine having hydroxyl group, among which diethylene triamine, triethylene tetratriamine or other polyamine having primary amino group is preferred.

To obtain a polyurethane resin having hydroxyl group, a compound having hydroxyl group is used for the chain-extending agent and/or reaction-stopping agent. Preferably a compound having hydroxyl group is used for both the chain-extending agent and the reaction-stopping agent. For the chain-extending agent, examples include N-(2-hydroxy ethyl) ethylene diamine, N-(2-hydroxy ethyl) propylene diamine, N, N'-di(2-hydroxy ethyl) ethylene diamine, other diamines having hydroxyl group, and the like. For the reaction-stopping agent, examples include N-(2-hydroxy ethyl) ethylene diamine, N-(2-hydroxy ethyl) propylene diamine, N, N'-di(2-hydroxy ethyl) ethylene diamine and other diamines having hydroxyl group, monoethanol amine, diethanol amine other alkanol amines having hydroxyl group, and the like.

Under the present invention, an organic diisocyanate may be obtained using any of the materials mentioned above and adopting any known polyurethane resin manufacturing method. Also, changing the molecular weight, chemical structure, and equivalent ratio of each component changes the hardness of the obtained polyurethane resin; accordingly, the printability and laminatability can be adjusted by selecting and combining these different components as deemed appropriate.

Preferably the solid content of the binder resin at the time of printing is 5 to 15 percent by mass in the printing ink composition for laminate. If the content of the binder resin is outside this range, the tearing property tends to drop.

Also, the mass-average molecular weight of the polyurethane resin in the printing ink composition for laminate proposed by the present invention is preferably in a range of 10000 to 70000, or more preferably in a range of 20000 to 40000.

<Vinyl Chloride-Vinyl Acetate Copolymer>

For the vinyl chloride-vinyl acetate copolymer, any copolymer of vinyl chloride monomer and vinyl acetate monomer traditionally used in printing ink compositions for laminate may be used.

Specific examples include SOLBIN C, SOLBIN CL, SOLBIN CH, SOLBIN CN, SOLBIN CSR, SOLBIN A, SOLBIN AL, SOLBIN TA2, SOLBIN TA3, SOLBIN TAO, SOLBIN TASR, SOLBIN M, SOLBIN ME, SOLBIN MFK (all manufactured by Nissin Chemical Industry), VINNOL E115/48A, VINNOL E22/48A, VINNOL E14/45, VINNOL H14/36, VINNOL H40/55, VINNOL E15/45M (all manufactured by WACKER), and the like.

Among others, any vinyl chloride-vinyl acetate copolymer having hydroxyl group is more preferred because it is advantageous to use such copolymer in an environmentally-friendly organic ink solvent, in improving the performance pertaining to the object of the present invention. Such vinyl chloride-vinyl acetate copolymer having hydroxyl group may be obtained, for example, through partial saponification of ester acetate.

In the case of a vinyl chloride-vinyl acetate copolymer having hydroxyl group, which was obtained through partial saponification of ester acetate, the film property and dissolution behavior of the resin are determined by the ratio of its constitutional unit based on the reaction site of vinyl chloride (Formula 1 below), constitutional unit based on the reaction site of vinyl acetate (Formula 2 below), and constitutional unit based on the saponification of the reaction site of vinyl acetate (Formula 3 below), in the molecule.

To be specific, the constitutional unit based on the reaction site of vinyl chloride adds toughness and hardness to the resin film, the constitutional unit based on the reaction site of vinyl acetate adds adhesive property and flexibility, and the constitutional unit based on the saponification of the reaction site of vinyl acetate adds good solubility of the ink in an environmentally-friendly organic solvent.

—CH2-CHCl—  Formula 1

—CH2-CH(OCOCH3)-  Formula 2

—CH2-CH(OH)—  Formula 3

Furthermore, other binder resins such as cellulose resin, acrylic resin, polyamide resin, and adhesive resin, etc., may be added supplementarily.

<Curing Agent>

For the curing agent, a polyfunctional isocyanate compound may be used. To be specific, a biuret, isocyanurate, adduct, or other trifunctional isocyanate compound, or difunctional isocyanate compound, etc., may be used, where preferable examples include 24A-100, 22A-75, TPA-100, TSA-100, TSS-100, TAE-100, TKA-100, P301-75E, E402-808, E405-70B, AE700-100, D101, D201, A201H (manufactured by Asahi Kasei), MITEC Y260A (manufactured by Mitsubishi Chemical), CORONATE HX, CORONATE HL, CORONATE L (manufactured by Nippon Polyurethane), Desmodur N75MPA/X (manufactured by Bayer), and the like. Of these, an isophorone diisocyanate or adduct thereof is preferred. In addition, preferably an at least trifunctional isocyanate compound is used.

From the viewpoint of tearing property, the quantity of use of this curing agent should be such that the mass ratio of the contents of the polyurethane resin and vinyl chloride-vinyl acetate copolymer and that of the curing agent falls in a range of 1:0.2 to 0.9 ((polyurethane resin+vinyl chloride-vinyl acetate copolymer):curing agent); however, this ratio is preferably 1:0.4 to 0.9 ((polyurethane resin+vinyl chloride-vinyl acetate copolymer):curing agent), or more preferably 1:0.48 to 0.75 ((polyurethane resin+vinyl chloride-vinyl acetate copolymer):curing agent).

<Organic Solvent>

For the organic solvent used in the printing ink composition for laminate, any toluene- or ketone-based organic solvent (such as acetone, methyl ethyl ketone, or methyl isobutyl ketone), ester-based solvent (such as methyl acetate, ethyl acetate, n-propyl acetate, n-butyl acetate, or isobutyl acetate), alcohol-based solvent (such as methanol, ethanol, n-propanol, isopropanol, or butanol), or hydrocarbon-based solvent (such as toluene or methyl cyclohexane), may be used.

It should be noted that, when the recent environmental issues to be addressed and the printability and drying property of ink, etc. are considered, the organic solvent used for printing ink composition for laminate at the time of printing should be, among those mentioned above, a mixed organic solvent of ester-based organic solvent and alcohol-based organic solvent where the mixing ratio is in a range of 50/50 to 95/5 (ester-based organic solvent/alcohol-based organic solvent), or preferably in a range of 60/40 to 85/15 (ester-based organic solvent/alcohol-based organic solvent).

Furthermore, from the viewpoint of printability of ink, propyl acetate should be contained preferably by 5 percent by mass or more, or more preferably by 15 percent by mass or more, in the printing ink composition for laminate at the time of printing.

<Additives>

Various additives, such as tackifier, crosslinking agent, lubricant, anti-blocking agent, antistatic agent, surface active agent, etc., may also be added to the printing ink composition for laminate.

<Method for Manufacturing the Printing Ink Composition for Laminate Proposed by the Present Invention>

The printing ink composition for laminate proposed by the present invention is manufactured from the various materials mentioned above, except for those relating to curing agent, using various dispersion/kneading apparatuses traditionally used in general applications. Then, a viscosity in a range of 10 to 1000 mPa·s is achieved by adjusting the content of each solid material and the combination of polyurethane resin and organic solvent, among others, after which a curing agent is added at the time of printing in order to ensure stability over time, and also an organic solvent is added and the mixture is agitated at the ambient temperature at the time of printing until an appropriate viscosity is achieved for the printing conditions, or specifically until the flow-out time based on Zahn Cup #3 becomes 12 to 23 seconds, or preferably until this time becomes approx. 14 to 16 seconds in the case of high-speed printing; this way, the printing ink composition for laminate proposed by the present invention can be obtained.

<Easily Tearable Laminate>

Next, an easily tearable laminate obtained by printing the printing ink for laminate on a base film and then applying an adhesive that contains polyester-based adhesive having hydroxyl group and/or isocyanate-based adhesive having isocyanate group, and layering a sealant film thereon, is explained.

(Base Film)

The base film for the easily tearable laminate proposed by the present invention is not limited in any way, and any of polyethylene, polypropylene, and other polyolefin films, polyethylene terephthalate, polylactic acid, polycaprolactone, and other polyester films, or nylon, vinylon, and various other printing plastic films, may be used.

(Printing Ink Composition for Laminate)

For the printing ink composition for laminate, the aforementioned printing ink composition for laminate may be used.

(Adhesive)

Any adhesive having hydroxyl group which is traditionally used in extrusion lamination or dry lamination may be used. For example, an adhesive that contains polyester-based adhesive having hydroxyl group and isocyanate-based adhesive having isocyanate group may be used, among others.

To be specific, the adhesives (anchor coating agents) used in extrusion lamination include A-3210/A-3070, A-3210/A3072, A-3210/A-3075 (manufactured by Mitsui Chemicals), Seikadyne 2710A/Seikadyne 2810C (T), Seikadyne 2730A/Seikadyne 2730B, Seikadyne 2710A/Seikadyne 2710C (manufactured by Dainichiseika Color & Chemicals Mfg.), LX-500, LX-901, LX747A, etc., while the adhesives used in dry lamination include DICDRY LX-401A, 75A, 719, 703VL, 500, 510, etc. (manufactured by DIC Graphics; "DICDRY" is a registered trademark of DIC Graphics), Takelac/Takenate A-909/A-5, A-977/A-92, A-606/A-50, A-515/A-50, A-626/A-50, A-525/A-52, A-666/A-65, etc. (manufactured by Mitsui Chemicals), RU-77, 771, 3600, 3900, etc. (manufactured by Rock Paint), etc.

(Sealant Film)

For the sealant film, any plastic film traditionally used when a laminating means based on dry lamination is adopted, such as a non-stretched plastic film (non-stretched polyethylene film, non-stretched polypropylene film, etc., for example), may be used.

For the molten resin used in extrusion lamination involving layering of formed films, any traditionally used resin such as low-density polyethylene, LLDPE, ethylene-vinyl acetate copolymer, polypropylene, etc., may be used.

<Easily Tearable Laminate and Easily Tearable Laminate Bag>

The easily tearable laminate and easily tearable laminate bag proposed by the present invention are explained.

First, the printing ink composition for laminate proposed by the present invention is used to print desired patterns, text, etc., on the aforementioned base material for printing, by means of any general printing method such as gravure printing or flexographic printing.

The obtained printed matter is laminated, or specifically a hot-melt polymer called "sealant" is layered on it. Two methods are mostly used for this lamination.

The first is the extrusion lamination method that involves printing using the printing ink composition for laminate, applying an adhesive (also called "anchor coating agent") on the surface of the printed area after or before the printed area is cured with a curing agent, and then layering a hot-melt polymer thereon as a molten resin. Under the extrusion lamination method, an adhesive (such as an adhesive that contains polyester-based adhesive having hydroxyl group and isocyanate-based adhesive having isocyanate group, etc.) is applied on the surface of the printed matter, after which a molten resin is layered thereon using any known extrusion laminator. Furthermore, this molten resin may be used as an intermediate layer, and other material may be layered thereon, to create a sandwich of layers. It should be noted that, for the adhesive, an isocyanate-based anchor coat agent is preferred to an imine-based anchor coat agent because using the former results in better adhesive force.

The second is the dry lamination method that involves printing using the printing ink composition for laminate, applying an adhesive (such as an adhesive that contains polyester-based adhesive having hydroxyl group and isocyanate-based adhesive having isocyanate group, etc.) on the surface of the printed area after or before the printed area is cured with a curing agent, and then layering a non-stretched plastic film thereon. In particular, the lamination may be achieved using multiple layers of films, with a metal foil used in retort applications sandwiched in between beforehand.

The easily tearable laminate obtained by one of these methods then undergoes a process where its sealant surfaces are sealed together using a heat-sealer, etc., and finally becomes an easily tearable laminate bag.

It should be noted that one feature that applies commonly to both of these methods is that, if an adhesive is to be applied after the printed area that has been printed using the printing ink composition for laminate is cured with a curing agent, then the printing ink composition for laminate and the adhesive may each be cured using a different functional group(s), or in other words using a different curing mechanism, or alternately the two may both use a curing agent containing the same active functional group(s). As a result, selecting a more appropriate combination of printing ink composition for laminate and adhesive becomes possible.

On the other hand, if an adhesive is to be applied before the printed area that has been printed using the printing ink composition for laminate is cured with a curing agent, then the printing ink composition for laminate and the adhesive may both use a curing agent containing the same active functional group(s).

Examples

The present invention is explained in greater detail below using examples; however, the present invention is not limited to these examples. It should be noted that, unless otherwise specified, "percent" means "percent by mass," while "part" means "part by mass."

(Manufacturing of Polyurethane Resin Varnish)

Example of Manufacturing of Polyurethane Resin Varnish A (Having Terminal Primary Amino Group and Terminal Hydroxyl Group)

Into a four-way flask equipped with an agitator, a cooling tube and a nitrogen gas introduction tube, 100 parts by mass of a 3-methyl-1,5-pentylene adipate diol of 2000 in average molecular weight, 100 parts by mass of a polypropylene glycol of 2000 in average molecular weight, and 44.4 parts by mass of isophorone diisocyanate, were input and, while introducing nitrogen gas, the ingredients were caused to react with one another for 6 hours at 100 to 105° C. The mixture was let cool to near room temperature, and then 521 parts by mass of ethyl acetate and 92 parts by mass of isopropyl alcohol were added, after which 15.6 parts by mass of isophorone diamine were added to extend the chain, and 0.31 parts by mass of monoethanol amine were added further to react with the mixture, after which 1.68 parts by mass of isophorone diamine and 0.17 parts by mass of diethylene triamine were added to stop the reaction, to obtain polyurethane resin varnish A (with a solid content of 30 percent by mass and viscosity of 250 mPa·s/25° C.).

Example of Manufacturing of Polyurethane Resin Varnish B (Having Terminal Primary Amino Group and Intramolecular and Terminal Hydroxyl Group)

Into a four-way flask equipped with an agitator, a cooling tube and a nitrogen gas introduction tube, 100 parts by mass of a 3-methyl-1,5-pentylene adipate diol of 2000 in average molecular weight, 100 parts by mass of a polypropylene glycol of 2000 in average molecular weight, 35.5 parts by mass (0.16 mol) of isophorone diisocyanate, and 4.7 parts by mass (0.04 mol) of N-(2-hydroxy ethyl) propylene diamine, were input and, while introducing nitrogen gas, the ingredients were caused to react with one another for 6 hours at 100 to 105° C. The mixture was let cool to near room temperature, and then 521 parts by mass of ethyl acetate and 92 parts by mass of isopropyl alcohol were added, after which 15.6 parts by mass of isophorone diamine were added to extend the chain, and 0.31 parts by mass of monoethanol amine were added further to react with the mixture, after which 1.68 parts by mass of isophorone diamine and 0.17 parts by mass of diethylene triamine were added to stop the reaction, to obtain polyurethane resin varnish B (with a solid content of 30 percent by mass and viscosity of 250 mPa·s/25° C.).

Example of Manufacturing of Polyurethane Resin Varnish C (Having Terminal Primary Amino Group and Terminal Hydroxyl Group)

Into a four-way flask equipped with an agitator, a cooling tube and a nitrogen gas introduction tube, 100 parts by mass of a 3-methyl-1,5-pentylene adipate diol of 2000 in average molecular weight, 100 parts by mass of a polypropylene glycol of 2000 in average molecular weight, and 44.4 parts by mass of isophorone diisocyanate, were input and, while introducing nitrogen gas, the ingredients were caused to react with one another for 6 hours at 100 to 105° C. The mixture was let cool to near room temperature, and then 523 parts by mass of ethyl acetate and 92 parts by mass of isopropyl alcohol were added, after which 13.6 parts by mass of isophorone diamine were added to extend the chain, and 0.49 parts by mass of monoethanol amine were added further to react with the mixture, after which 4.76 parts by mass of isophorone diamine and 0.41 parts by mass of diethylene triamine were added to stop the reaction, to obtain polyurethane resin varnish C (with a solid content of 30 percent by mass and viscosity of 200 mPa·s/25° C.).

Example of Manufacturing of Polyurethane Resin Varnish D (Having Terminal Primary Amino Group, and No Hydroxyl Group)

Into a four-way flask equipped with an agitator, a cooling tube and a nitrogen gas introduction tube, 100 parts by mass of a 3-methyl-1,5-pentylene adipate diol of 2000 in average molecular weight, 100 parts by mass of a polypropylene glycol of 2000 in average molecular weight, and 44.4 parts by mass of isophorone diisocyanate, were input and, while introducing nitrogen gas, the ingredients were caused to react with one another for 6 hours at 100 to 105° C. The mixture was let cool to near room temperature, and then 521 parts by mass of ethyl acetate and 92 parts by mass of isopropyl alcohol were added, after which 15.6 parts by mass of isophorone diamine were added to extend the chain, and then 2.54 parts by mass of isophorone diamine and 0.17 parts by mass of diethylene triamine were added to stop the reaction, to obtain polyurethane resin varnish D (with a solid content of 30 percent by mass and viscosity of 250 mPa·s/25° C.).

Example of Manufacturing of Polyurethane Resin Varnish E (Having No Terminal Primary Amino Group, but Having Hydroxyl Groups at Both Ends, i.e., Having Two Hydroxyl Groups)

Into a four-way flask equipped with an agitator, a cooling tube and a nitrogen gas introduction tube, 100 parts by mass of a 3-methyl-1,5-pentylene adipate diol of 2000 in average molecular weight, 100 parts by mass of a polypropylene glycol of 2000 in average molecular weight, and 44.4 parts by mass of isophorone diisocyanate, were input and, while introducing nitrogen gas, the ingredients were caused to react with one another for 6 hours at 100 to 105° C. The mixture was let cool to near room temperature, and then 521 parts by mass of ethyl acetate and 92 parts by mass of isopropyl alcohol were added, after which 15.6 parts by mass of isophorone diamine were added to extend the chain, and 1.01 parts by mass of monoethanol amine were added further to stop the reaction, to obtain polyurethane resin varnish E (with a solid content of 30 percent by mass and viscosity of 230 mPa·s/25° C.).

(Manufacturing of Vinyl Chloride-Vinyl Acetate Copolymer Varnish)

Vinyl Chloride-Vinyl Acetate Copolymer Varnish 1

20 parts of a vinyl chloride-vinyl acetate copolymer (product name: SOLBIN TA3 manufactured by Nissin Chemical Industry) were dissolved in a mixed organic solvent constituted by 40 parts of methyl ethyl ketone, 20 parts of ethyl acetate, and 20 parts of propyl acetate, to obtain vinyl chloride-vinyl acetate copolymer varnish 1 with a solid content of 20%.

Vinyl Chloride-Vinyl Acetate Copolymer Varnish 2

20 parts of a vinyl chloride-vinyl acetate copolymer (product name: VINNOL E15/48A, manufactured by WACKER) were dissolved in a mixed organic solvent constituted by 40 parts of methyl ethyl ketone, 20 parts of ethyl acetate, and 20 parts of propyl acetate, to obtain vinyl chloride-vinyl acetate copolymer varnish 2 with a solid content of 20%.

Manufacturing of Printing Ink Composition for Laminate 35 parts by mass of pigment (titanium oxide) were blended with polyurethane resin varnish A to E, vinyl chloride-vinyl acetate copolymer varnish 1 or 2, and 10 parts by mass of mixed solvent according to the blending ratios in Table 1, respectively, and then each mixture was kneaded using a paint conditioner, after which the remaining mixed solvent was added according to the blending ratio in Table 1, and the ingredients were mixed, after which 100 parts by mass of each mixture thus obtained were diluted with a curing agent (MITEC NY 260A manufactured by Mitsubishi Chemical; "MITEC" is a registered trademark of Mitsubishi Chemical) and the mixed solvent, to adjust the viscosity at 15 seconds using Zahn Cup #3 manufactured by Rigo, thereby obtaining the printing ink compositions for laminate in Examples 1 to 11 and Comparative Examples 1 to 3.

<Performance Evaluation>

The printing ink compositions for laminate in Examples 1 to 10 and Comparative Examples 1 to 3 were printed using a gravure printer (manufactured by Higashitani Seisakusho) equipped with an engraving plate (Helio, 175 lines), while the printing ink composition for laminate in Example 11 was printed using the same gravure printer equipped with an engraving plate (Helio, 200 lines), onto the processing surface of ONY#15 (N-1102 of 15 μm in thickness manufactured by Toyobo; hereinafter referred to as "base film") at a printing speed of 100 m/min.

(Dry Laminates)

Onto each of the printed matters obtained in Examples 1 to 11 and Comparative Examples 1 to 3, an adhesive that contains polyester-based adhesive having hydroxyl group and isocyanate-based adhesive having isocyanate group (ethyl acetate solution of A-515/A-50 manufactured by Mitsui Chemicals) was applied, and then a sealant film LLDPE#50 (L-4104 manufactured by Toyobo) was layered thereon using a dry laminator, to obtain a laminate.

(Extrusion Laminates)

Onto each of the printed matters obtained in Examples 1 to 11 and Comparative Examples 1 to 3, an adhesive (A-3210/A-3070 (manufactured by Mitsui Chemicals)) was applied, and then a molten polyethylene was layered thereon using an extrusion laminator, to obtain a laminate.

(Evaluation of Color Development Property)

The printing ink compositions for laminate in Examples 1 to 11 and Comparative Examples 1 to 3 were printed onto the aforementioned base films with a gravure printer using a 175-line or 200-line printing plate, and the resulting printed matters were visually observed for color development property based on the color development property of the printing ink composition for laminate in Example 8 as the standard, and the results were evaluated according to the following evaluation standards:

◯: Developed colors are clearly sharper than those under Example 8.

x: Developed colors are not sharper than those under Example 8.

(Evaluation of Tearing Property)

The laminates obtained as dry laminates or extrusion laminates under Examples 1 to 11 and Comparative Examples 1 to 3 were let stand for three days at 40° C., after which cutting marks were made thereon using a cutting knife, and each laminate was torn by hands to evaluate the tearing property.

◯: Can be torn with less resistance than in the reference example.

Δ: Can be torn with the same level of resistance as in the reference example.

x: Can be torn, although the resistance is greater than in the reference example, or the sealant stretches.

(Laminatability)

Laminatability was evaluated based on the boilability and retortability of each printed PET film.

<Boilability>

The printing ink compositions for laminate in Examples 1 to 10 and Comparative Examples 1 to 3 were printed using a gravure printer (manufactured by Higashitani Seisakusho) equipped with an engraving plate (Helio, 175 lines), while the printing ink composition for laminate in Example 11 was printed using the same gravure printer equipped with an engraving plate (Helio, 200 lines), onto the processing surface of a polyethylene terephthalate film (E-5101 of 12 μm in thickness manufactured by Toyobo; hereinafter referred to as "PET film"), one side of which was treated by corona discharge, at a printing speed of 100 m/min. One day after the printing, an isocyanate-based adhesive (Takelac A-3072/Takenate A-3210 manufactured by Mitsui Chemicals & SKC Polyurethanes) was applied onto each printed PET film, after which a polyethylene (Sumikathene L705 manufactured by Sumitomo Chemical) that had been melted at 345° C. was layered thereon to a thickness of 25 μm using an extrusion laminator, and then the laminate was let stand for one day at 40° C., to obtain an extrusion laminate. This extrusion laminate was made into a bag, and then a mixture consisting of 90 percent by weight of water and 10 percent by weight of salad oil was put in the bag, after which the bag was sealed and immersed in 90° C. hot water for 60 minutes, to evaluate the boilability based on whether or not the laminate separated.

◯: The laminate did not separate at all.

Δ: The laminate partially separated in pinhole shapes or along thin, short lines.

<Retortability>

The printing ink compositions for laminate in Examples 1 to 10 and Comparative Examples 1 to 3 were printed using a gravure printer (manufactured by Higashitani Seisakusho) equipped with an engraving plate (Helio, 175 lines), while the printing ink composition for laminate in Example 11 was printed using the same gravure printer equipped with an engraving plate (Helio, 200 lines), onto the processing surface of a PET film (E-5101 of 12 μm in thickness manufactured by Toyobo), one side of which was treated by corona discharge, at a printing speed of 100 m/min. One day after the printing, an urethane-based adhesive (Takelac A-616/Takenate A-65 manufactured by Mitsui Chemicals &

SKC Polyurethanes) was applied onto each printed PET film by a quantity equivalent to 2.0 g/m² in solid content, and a non-stretched polypropylene film (RXC-22 of 60 μm in thickness, manufactured by Mitsui Chemicals Tohcello) was attached thereon using a dry laminator, after which the laminate was let stand for three days at 40° C., to obtain a dry laminate. This dry laminate was made into a bag, and then a mixture consisting of 90 percent by weight of water and 10 percent by weight of salad oil was put in the bag, after which the bag was sealed and immersed in 120° C. hot water under pressure for 60 minutes, to evaluate the retortability based on whether or not the laminate separated. The same standards used for evaluating boilability were used.

proposed by the present invention, exhibited good color development property, boilability, and retortability regardless of whether the 175-line or 200-line printing plate was used. Furthermore, the laminate in all Examples, except for Example 10, was easy to tear without any resistance regardless of whether the dry lamination method or extrusion lamination method was used.

In particular, it is clear from the laminate in Example 10 that contained the curing agent by the same quantity as the laminate in Comparative Example 2, but differed from the laminate in Comparative Example 2 by containing a vinyl chloride-vinyl acetate copolymer varnish, that the vinyl chloride-vinyl acetate copolymer varnish improved the ease

TABLE 1

| | | | Example | | | | | | | | | | | Comparative example | | | Reference example |
|---|---|---|---|---|---|---|---|---|---|---|---|---|---|---|---|---|---|---|
| | | | 1 | 2 | 3 | 4 | 5 | 6 | 7 | 8 | 9 | 10 | 11 | 1 | 2 | 3 | |
| Printing ink composition for laminate | Titanium oxide | | 35 | 35 | 35 | 35 | 35 | 35 | 35 | 35 | 35 | 35 | 35 | 35 | 35 | 35 | 35 |
| | Polyurethane resin varnish (with a solid content of 30%) | A | 24 | 21 | 21 | 18 | 12 | — | — | — | 21 | 21 | — | 21 | 30 | — | 30 |
| | | B | — | — | — | — | — | 21 | — | — | — | — | — | — | — | — | — |
| | | C | — | — | — | — | — | — | — | — | — | — | 21 | — | — | — | — |
| | | D | — | — | — | — | — | — | 21 | — | — | — | — | — | — | — | — |
| | | E | — | — | — | — | — | — | — | 21 | — | — | — | — | — | — | — |
| | Vinyl chloride-vinyl acetate copolymer varnish (with a solid content of 20%) | 1 | 9 | 13.5 | 13.5 | 18 | 27 | 13.5 | 13.5 | 13.5 | — | 13.5 | 13.5 | 13.5 | — | 45 | — |
| | | 2 | — | — | — | — | — | — | — | — | 13.5 | — | — | — | — | — | — |
| | Mixed solvent | | 32 | 30.5 | 30.5 | 29 | 26 | 30.5 | 30.5 | 30.5 | 30.5 | 30.5 | 30.5 | 30.5 | 35 | 20 | 35 |
| | Curing agent (with a solid content of 75.27%) | | 9.3 | 9.3 | 6.7 | 9.3 | 9.3 | 9.3 | 9.3 | 9.3 | 9.3 | 4.0 | 9.3 | 2.0 | 4.0 | 6.7 | 6.7 |
| | Mixed solvent | | 50 | 50 | 50 | 50 | 50 | 50 | 50 | 50 | 50 | 50 | 20 | 50 | 50 | 50 | 50 |
| Blending ratio of polyurethane resin/vinyl chloride-vinyl acetate copolymer | | | 8/2 | 7/3 | 7/3 | 6/4 | 4/6 | 7/3 | 7/3 | 7/3 | 7/3 | 7/4 | 7/3 | 7/3 | 10/0 | 0/10 | 10/0 |
| Flow-out time at printing based on Zahn Cup #3 (sec/25° C.) | | | 15 | 15 | 15 | 15 | 15 | 15 | 15 | 15 | 15 | 16 | 15 | 15 | 15 | 15 | 15 |
| Printing plate Helio | | | | | | | 175 lines | | | | | | 200 lines | | 175 lines | | |
| Printing speed | | | | | | | 100 | | | | | | | | 100 | | |
| Color development property | | | ○ | ○ | ○ | ○ | ○ | ○ | ○ | — | ○ | ○ | ○ | ○ | ○ | X | ○ |
| Ease of tearing | Dry laminate | | ○ | ○ | ○ | ○ | ○ | ○ | ○ | ○ | ○ | ○ | Δ | ○ | X | X | ○ | — |
| | Extrusion laminate | | ○ | ○ | ○ | ○ | ○ | ○ | ○ | ○ | ○ | ○ | Δ | ○ | X | X | ○ | — |
| Boilability | | | ○ | ○ | ○ | ○ | ○ | ○ | ○ | ○ | ○ | ○ | ○ | ○ | ○ | Δ | ○ |
| Retortability | | | ○ | ○ | ○ | ○ | ○ | ○ | ○ | ○ | ○ | ○ | ○ | ○ | ○ | Δ | ○ |

Curing agent: Isophorone diisocyanate (IPDI adduct) (MITEC NY260A manufactured by Mitsubishi Chemical)
Mixed solvent: Ethyl acetate/Propyl acetate/Isopropyl alcohol=50/25/25 (ratio by mass)

The laminate according to Comparative Example 1, where the ratio of the curing agent to the polyurethane resin and vinyl chloride-vinyl acetate copolymer used was below the range specified under the present invention, exhibited good color development property; however, the laminate was less easy to tear in that it was barely torn with the sealant stretching somewhat. Also, the laminate according to Comparative Example 2 containing no vinyl chloride-vinyl acetate copolymer was less easy to tear. The laminate according to Comparative Example 3 containing no polyurethane resin was easy to tear; however, its color development property, boilability and retortability were poor.

On the other hand, the laminates in the Examples, each printed using the printing ink composition for laminate of tearing. Similarly, the laminate in Example 3, which was same as the laminate in the reference example except that the former contained a vinyl chloride-vinyl acetate copolymer varnish, also exhibited greater ease of tearing.

What is claimed is:

1. A printing ink composition for constituting a printed layer for lamination, wherein the printing ink composition contains a pigment, a binder resin, a polyfunctional isocyanate compound as curing agent, and an organic solvent, wherein:
   the binder resin is a polyurethane resin and a vinyl chloride-vinyl acetate copolymer;
   at least one of the polyurethane resin and vinyl chloride-vinyl acetate copolymer has a reactive group that reacts with an isocyanate group in the polyfunctional isocyanate compound;
   a ratio of a solid content of the polyurethane resin and that of the vinyl chloride-vinyl acetate copolymer is in a range of 9/1 to 1/9 (polyurethane resin/vinyl chloride-vinyl acetate copolymer); and a ratio of a sum of solid contents of the polyurethane resin and vinyl chloride-vinyl acetate copolymer and a solid content of the curing agent is in a range of 1:0.2 to 0.9 ((polyurethane resin+vinyl chloride-vinyl acetate copolymer):curing agent).

2. The printing ink composition for lamination according to claim 1, wherein that the reactive group in the polyurethane resin, which reacts with the isocyanate group in the polyfunctional isocyanate compound, is an amino group and/or hydroxyl group, and the reactive group in the vinyl chloride-vinyl acetate copolymer, which reacts with the isocyanate group, is a hydroxyl group.

3. The printing ink composition for lamination according to claim 1, wherein the binder resin is (1) a polyurethane resin having, at its end, at least one primary or secondary amino group as well as hydroxyl group, and/or (2) a polyurethane resin having, at its end, at least one primary or secondary amino group, and a vinyl chloride-vinyl acetate copolymer having a hydroxyl group.

4. The printing ink composition for lamination according to claim 1, wherein the ratio of a sum of solid contents of the polyurethane resin and vinyl chloride-vinyl acetate copolymer and a solid content of the curing agent is in a range of 1:0.4 to 0.9 ((polyurethane resin+vinyl chloride-vinyl acetate copolymer):curing agent).

5. The printing ink composition for lamination according to claim 1, wherein the ratio of a solid content of the polyurethane resin and that of the vinyl chloride-vinyl acetate copolymer is in a range of 9/1 to 4/6 (polyurethane resin/vinyl chloride-vinyl acetate copolymer).

6. The printing ink composition for lamination according to claim 1, wherein the polyfunctional isocyanate compound is a trifunctional isocyanate compound.

7. The printing ink composition for lamination according to claim 1, wherein the organic solvent is a mixture of ester-based solvent and alcohol-based solvent.

8. The printing ink composition for lamination according to claim 2, wherein the binder resin is (1) a polyurethane resin having, at its end, at least one primary or secondary amino group as well as hydroxyl group, and/or (2) a polyurethane resin having, at its end, at least one primary or secondary amino group, and a vinyl chloride-vinyl acetate copolymer having a hydroxyl group.

9. The printing ink composition for lamination according to claim 2, wherein the ratio of a sum of solid contents of the polyurethane resin and vinyl chloride-vinyl acetate copolymer and a solid content of the curing agent is in a range of 1:0.4 to 0.9 ((polyurethane resin+vinyl chloride-vinyl acetate copolymer):curing agent).

10. The printing ink composition for lamination according to claim 2, wherein the ratio of a solid content of the polyurethane resin and that of the vinyl chloride-vinyl acetate copolymer is in a range of 9/1 to 4/6 (polyurethane resin/vinyl chloride-vinyl acetate copolymer).

11. The printing ink composition for lamination according to claim 2, wherein the polyfunctional isocyanate compound is a trifunctional isocyanate compound.

12. The printing ink composition for lamination according to claim 2, wherein the organic solvent is a mixture of ester-based solvent and alcohol-based solvent.

13. The printing ink composition for lamination according to claim 3, wherein the ratio of a sum of solid contents of the polyurethane resin and vinyl chloride-vinyl acetate copolymer and a solid content of the curing agent is in a range of 1:0.4 to 0.9 ((polyurethane resin+vinyl chloride-vinyl acetate copolymer):curing agent).

14. The printing ink composition for lamination according to claim 3, wherein the ratio of a solid content of the polyurethane resin and that of the vinyl chloride-vinyl acetate copolymer is in a range of 9/1 to 4/6 (polyurethane resin/vinyl chloride-vinyl acetate copolymer).

15. The printing ink composition for lamination according to claim 3, wherein the polyfunctional isocyanate compound is a trifunctional isocyanate compound.

16. The printing ink composition for lamination according to claim 3, wherein the organic solvent is a mixture of ester-based solvent and alcohol-based solvent.

* * * * *